United States Patent
Heo et al.

(10) Patent No.: US 8,902,499 B2
(45) Date of Patent: Dec. 2, 2014

(54) DISPLAY MODULE AND MOBILE TERMINAL HAVING THE SAME

(75) Inventors: Won Heo, Gyeonggi-Do (KR); Hungchol Chin, Seoul (KR)

(73) Assignee: LG Electronics Inc., Seoul (KR)

(*) Notice: Subject to any disclaimer, the term of this patent is extended or adjusted under 35 U.S.C. 154(b) by 211 days.

(21) Appl. No.: 13/462,640

(22) Filed: May 2, 2012

(65) Prior Publication Data

US 2012/0327334 A1 Dec. 27, 2012

(30) Foreign Application Priority Data

May 2, 2011 (KR) .................. 10-2011-0041631

(51) Int. Cl.
- *G02F 1/1335* (2006.01)
- *G02B 5/08* (2006.01)
- *G02B 5/20* (2006.01)

(52) U.S. Cl.
CPC ............ *G02F 1/133502* (2013.01); *G02F 2001/133562* (2013.01); *G02F 2202/42* (2013.01); *G02F 2203/11* (2013.01); *G02F 2201/38* (2013.01)
USPC .......................................... 359/359; 349/104

(58) Field of Classification Search
CPC ................ G02F 1/133502; G02F 1/133562
USPC .......................................... 359/359; 349/104
See application file for complete search history.

(56) References Cited

U.S. PATENT DOCUMENTS

| | | | |
|---|---|---|---|
| 5,508,091 A * | 4/1996 | Austin | 428/216 |
| 5,986,737 A * | 11/1999 | Evanicky et al. | 349/137 |
| 2011/0083765 A1* | 4/2011 | Stark et al. | 138/97 |
| 2011/0090444 A1* | 4/2011 | Kimura | 349/138 |
| 2012/0162751 A1* | 6/2012 | Liang et al. | 359/359 |

FOREIGN PATENT DOCUMENTS

| | | |
|---|---|---|
| EP | 0596531 A1 | 5/1994 |
| EP | 2284579 A1 | 2/2011 |
| JP | 4-182625 A | 6/1992 |
| JP | 2001-305542 A | 10/2001 |

* cited by examiner

*Primary Examiner* — Nathanael R Briggs
(74) *Attorney, Agent, or Firm* — Birch, Stewart, Kolasch & Birch, LLP

(57) ABSTRACT

A display module including a first substrate and a second substrate facing each other; a liquid crystal layer located between the first and second substrates; a first polarizer laminated on the first substrate; and a conversion layer laminated on the first polarizer. Further, the conversion layer includes a plurality of first films and a plurality of second films in an alternating manner, each of the first films having a first refractive index, and each of the second films being laminated on a lower surface of a corresponding first film and having a second refractive index lower than the first refractive index.

19 Claims, 4 Drawing Sheets

B/L OFF

DISPLAY MODULE AND MOBILE TERMINAL HAVING THE SAME

CROSS-REFERENCE TO RELATED APPLICATIONS

Pursuant to 35 U.S.C. §119(a), this application claims the benefit of earlier filing date and right of priority to Korean Application No. 10-2011-0041631, filed on May 2, 2011, the contents of which is incorporated by reference herein in its entirety.

BACKGROUND OF THE INVENTION

1. Field of the Invention

This specification relates to a display module capable of reproducing an image and a mobile terminal having the same.

2. Background of the Invention

A terminal can now be used to capture still images or moving images, play music or video files, play games, receive broadcasts and the like in addition to regular phone calls and thus functions as an integrated multimedia player. Such terminals can be divided into mobile/portable terminals and stationary terminals according to their mobility. The mobile terminals can be easily carried and have one or more of functions such as supporting voice and video telephony calls, inputting and/or outputting information, storing data and the like.

Various new attempts have been made for the terminals by hardware or software in order to implement and enhance such complicated functions. Especially, in view of manufacturing the mobile terminal, several approaches for making an outer face of a display unit or the like more attractive have been considered.

SUMMARY OF THE INVENTION

Accordingly, one object of the present invention is to provide a mobile terminal having an appearance in a different shape from the related art, and more particularly, a mobile terminal equipped with a display module having a color closer to a black color in a non-operated state of a backlight unit.

To achieve these and other advantages and in accordance with the purpose of this specification, as embodied and broadly described herein, the present invention provides in one aspect a display module including a first substrate and a second substrate facing each other; a liquid crystal layer located between the first and second substrates; a first polarizer laminated on the first substrate; and a conversion layer laminated on the first polarizer. Further, the conversion layer includes a plurality of first films and a plurality of second films in an alternating manner, each of the first films having a first refractive index, and each of the second films being laminated on a lower surface of a corresponding first film and having a second refractive index lower than the first refractive index. The present invention also provides a corresponding method of manufacturing a display module for a mobile terminal.

In another aspect, the present invention provides a mobile terminal including a terminal main body; a wireless communication unit configured to wirelessly communicate with at least one other terminal; and a display module mounted in the terminal main body and configured to display image information. Further, the display module includes a first substrate and a second substrate facing each other; a liquid crystal layer located between the first and second substrates; a first polarizer laminated on the first substrate; and a conversion layer laminated on the first polarizer. In addition, the conversion film includes a plurality of first films and a plurality of second films in an alternating manner, each of the first films having a first refractive index, and each of the second films being laminated on a lower surface of a corresponding first film and having a second refractive index lower than the first refractive index.

As such, the mobile terminal according to an embodiment of the present invention has an aesthetically pleasing outer appearance.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
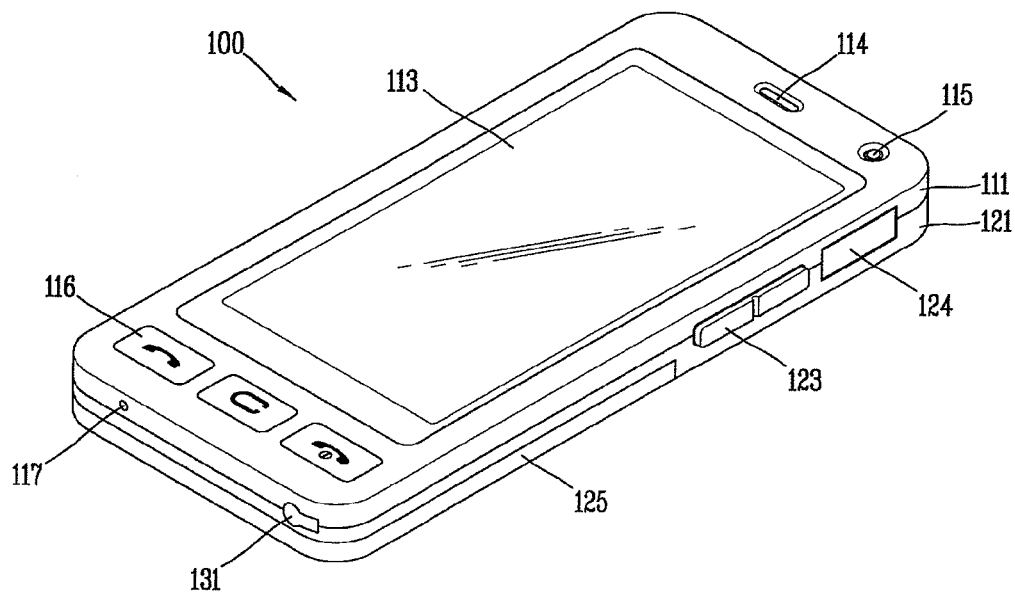
FIG. 1 is a front perspective view of a mobile terminal in accordance with one embodiment of the present invention.

Description will now be given in detail of a display module and a mobile terminal having the same according to the embodiments of the present invention, with reference to the accompanying drawings. This specification employs like/similar reference numerals for like/similar components irrespective of different embodiments, so they all will be understood by the first description.

A mobile terminal disclosed herein includes a portable phone, a smart phone, a laptop computer, a digital broadcast terminal, a personal digital assistant (PDA), a portable multimedia player (PMP), a navigational device, and the like. However, the configuration according to the embodiments of this specification can be applied to stationary terminals such as a digital TV, desktop computers and the like.

FIG. 1 is a front perspective view showing one embodiment of a mobile terminal 100 according to the present disclosure. In FIG. 1, a case (casing, housing, cover, etc.) forming an outer appearance of the first body includes a front case 111 and a rear case 121. A space formed by the front case 111 and the rear case 121 accommodates various components therein. At least one intermediate case may further be disposed between the front case 111 and the rear case 121. Such cases may be formed by injection-molded synthetic resin, or may be formed using a metallic material such as stainless steel (STS) or titanium (Ti).

The front case 111 is shown having a display unit 113, a first audio output module 114, a first image input unit 115, a first manipulation unit 116, an audio input unit 117 and the like. The display unit 113 includes a display module 200 (see FIG. 3), such as a Liquid Crystal Display (LCD) module, an Organic Light-Emitting Diode (OLED) module and the like to display visible information. The display unit 113 may be implemented as a touch screen so as to allow inputting of information by a user's touch.

In addition, the first audio output module 114 may include a receiver, a speaker or the like, and the first image input unit 115 may be a camera module for capturing images or video of the user and the like. Further, the first manipulation unit 116 may be manipulated to allow inputting of commands for controlling operations of the mobile terminal 100.

The audio input unit 117 may be implemented, for example, as a type of microphone for receiving voice or other sounds input by the user. In addition, the rear case 121 mounted to the rear surface of the mobile terminal 100 may be provided with a second manipulation unit 123, an interface 124, a power supply unit 125 and the like.

The second manipulation unit 123 may be installed at a side surface of the rear case 121. The first and manipulation units 116 and 123 may be referred to as a manipulating portion. Such manipulating portion can employ any tactile manner that a user can touch or tap for manipulation. For instance, the manipulating portion may be implemented as a dome switch, a touchpad or the like by which a user can input commands or information in a pushing or touching manner. Alternatively, the manipulating portion may be implemented as a wheel or a jog which rotates keys or a joystick.

From a functional perspective, the first manipulation unit 116 is configured to input commands such as START, END or the like, and the second manipulation unit 123 can be used as a hot key which performs a specific function, such as activating of the first image input unit 115, as well as a scroll function. Upon employing at least the first and second manipulation units 116 and 123, inputting of telephone numbers or text messages may be executed using a touch screen disposed on the display unit 113.

In addition, the interface 124 may serve as a path for allowing data exchange between the mobile terminal and an external device. For example, the interface 124 may be at least one of wired/wireless earphone ports, ports for short-range communication (e.g., IrDA, Bluetooth, WLAN, etc.), power supply terminals for power supply to the mobile terminal and the like. The interface 124 may be a card socket for coupling to external cards, such as a Subscriber Identity Module (SIM), a User Identity Module (UIM), a memory card for storage of information and the like.

The power supply unit 125 may be provided at the rear case 121 to supply power to at least one component of the mobile terminal 100. The power supply unit 125, for example, may include a rechargeable battery for power supply.

Figure 2:
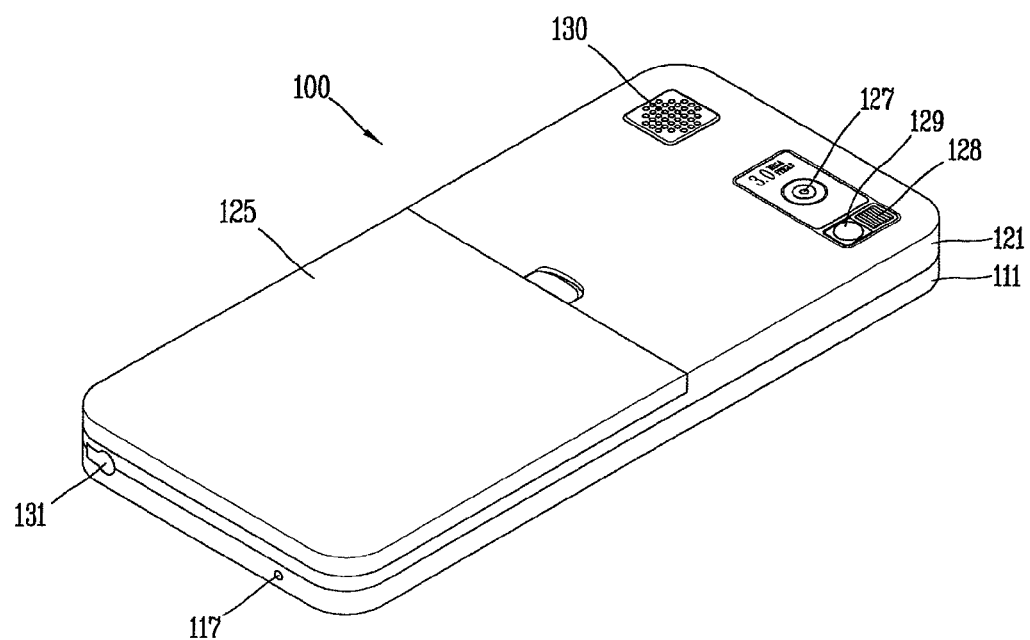
FIG. 2 is a rear perspective view of the mobile terminal shown in FIG. 1.

Next, FIG. 2 is a rear perspective view of the mobile terminal 100 shown in FIG. 1. As shown in FIG. 2, the rear case 121 is shown having a second image input unit 127, a second audio output module 130, a broadcast signal receiving antenna 131 and the like.

The second image input unit 127 faces a direction which is opposite to a direction faced by the first image input unit 115 (see FIG. 1), and may have different pixels from those of the first image input unit 115. For example, the first image input unit 115 may operate with relatively lower pixels (lower resolution). Thus, the first image input unit 115 may be useful when a user captures his or her face and sends it to another party during a video call or the like. On the other hand, the second image input unit 127 may operate with relatively higher pixels (higher resolution) such that it can be useful for a user to obtain higher quality pictures for later use.

A flash 128 and a mirror 129 may additionally be disposed adjacent to the second image input unit 127. The flash 128 operates in conjunction with the second image input unit 127 when taking a picture using the second image input unit 127. The mirror 129 can cooperate with the second image input unit 127 to allow a user to photograph himself in a self-portrait mode.

The second audio output module 130 can cooperate with the first audio output module 114 (see FIG. 1) to provide stereo output. Also, the audio output module 130 may be configured to operate as a speakerphone. In addition, the broadcast signal receiving antenna 131 may be disposed at one side of the rear case 121 in addition to an antenna for communications. The antenna 131 may be drawn out of the rear case 121.

As described above, the first manipulation unit 116 or the like is disposed at the front case 111 and the second manipulation unit 123 or the like is disposed at the rear case 121; however, the present disclosure is not limited to this configuration. For example, the second manipulation unit 123 may be disposed at the front case 111 in the vicinity of the first manipulation unit 116. In addition, without the second image input unit 127, the first image input unit 115 can be implemented to be rotatable so as to rotate up to a direction which the second image input unit 127 faces.

Figure 3:
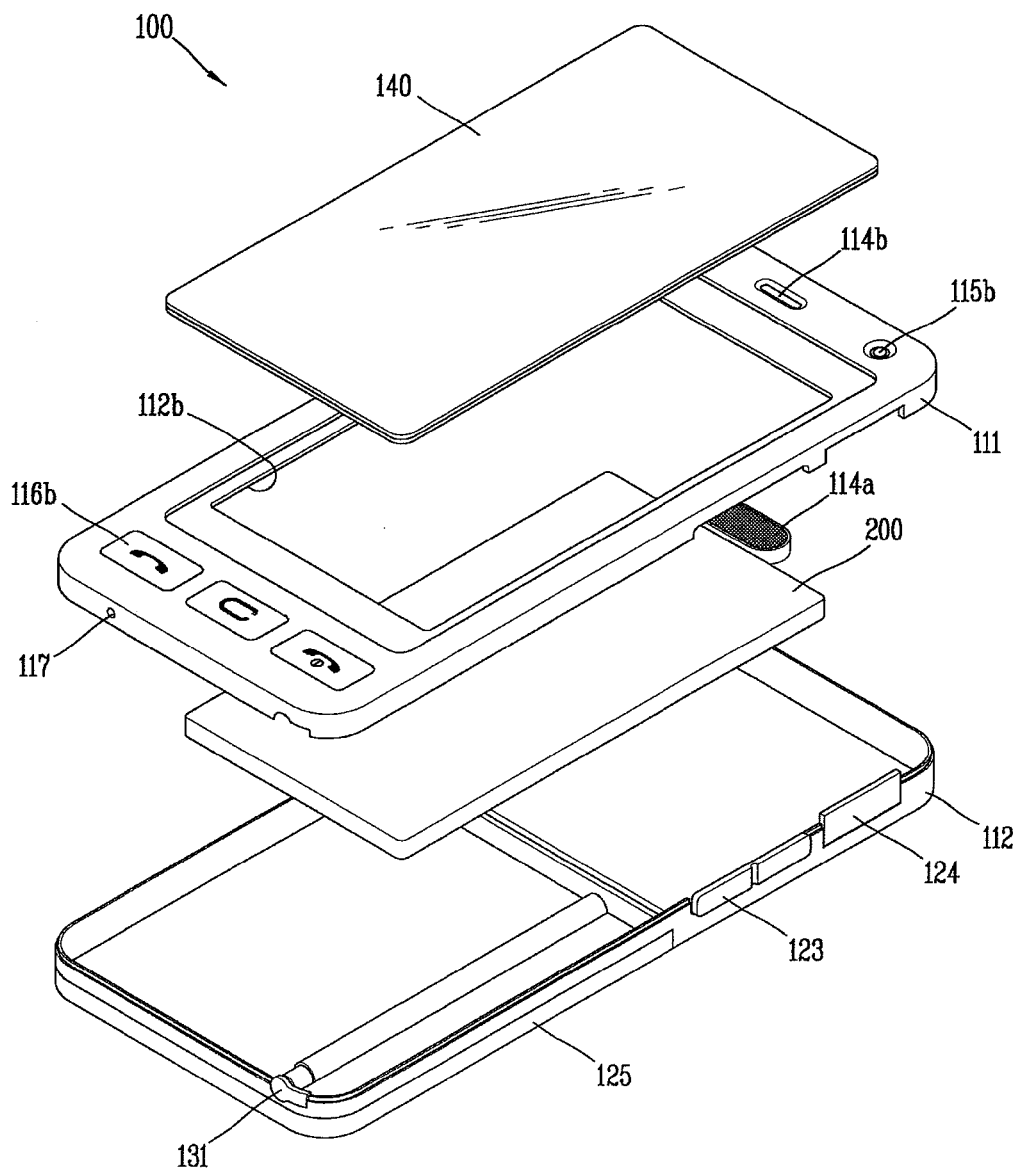
FIG. 3 is a disassembled perspective view of the mobile terminal shown in FIG. 1.

Next, FIG. 3 is a disassembled perspective view of the mobile terminal 100 shown in FIG. 1. As shown in FIG. 3, a window 140 is coupled to obscure one surface of the front case 111. The window 140 obscures the display module 200 such that visible information output on the display module 200 can be recognized from the exterior. The display module 200 and the window 140 may configure the display unit 113 (see FIG. 1).

The window 140 can be used to recognize a user's touch input for inputting of information (commands, signals, etc.). The window 140 has an area corresponding to that of the display module 200, and may be formed of a transparent material. The window 140 may have a completely opaque area or an area with extremely low light transmittance. For example, edges of the window 140 may be surface-processed such that light cannot be transmitted therethrough.

Also, the front case 111 includes a manipulation pad 116b corresponding to the first manipulation unit 116 (see FIG. 1). The manipulation pad 116b is a target touched or pressed by a user, and may be formed as a manipulation area at a portion of the window 140.

The front case 111 also includes a sound hole 114b, a window hole 112b and an image window 115b. The sound hole 114b is formed to correspond to the audio output module 114 such that sounds of the mobile terminal, for example, a ringtone, music and the like, can come therethrough. The window hole 112b is formed to correspond to the display unit 113, and the transparent image window 115b is formed to correspond to the first image input unit 115 (see FIG. 1). In addition, the rear case 121 is shown having the display module 200, a speaker module 114a, a camera module, a switch and the like.

Figure 4:
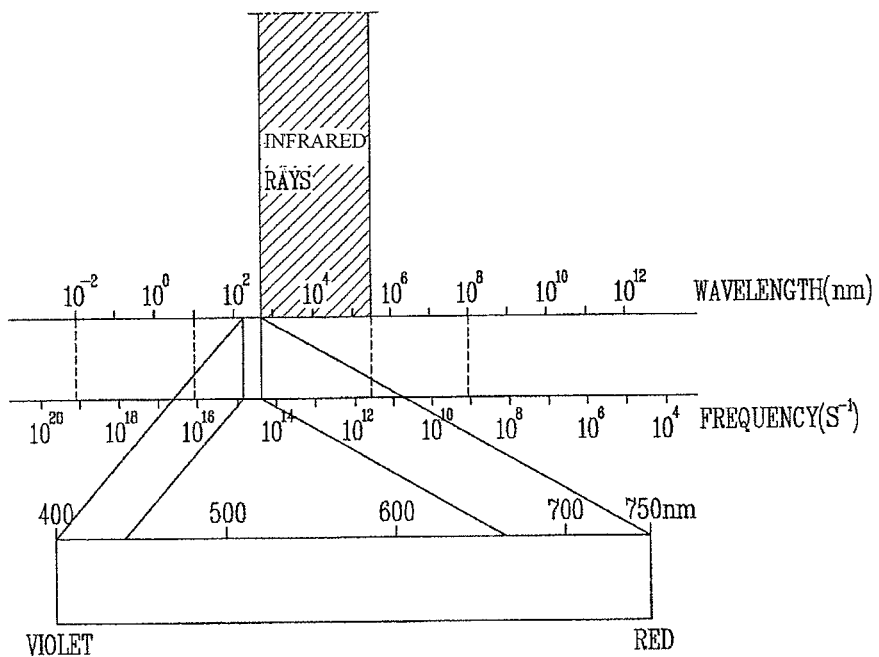
FIG. 4 is a graph showing a visible ray band and an infrared ray band based on wavelengths in accordance with the one embodiment of the present invention.

Next, FIG. 4 is a graph showing a visible ray band and an infrared ray band based on wavelengths in accordance with one embodiment of the present invention. As shown in FIG. 4, visible rays, which are light having a wavelength range detectable by human eyes, are electromagnetic having wavelengths approximately in the range of 380 nm to 780 nm. Although it depends on a person, wavelengths over 780 nm are not detectable by human eyes.

The embodiments of the present invention relate to converting wavelengths of visible rays incident on the display module into wavelength bands over infrared rays which are not recognized by human eyes. That is, as shown in FIG. 5, a conversion layer 280 is laminated on an LCD panel to absorb or convert wavelengths of a visible ray band, thereby implementing a true black display when power is not supplied to the display module.

Figure 5:
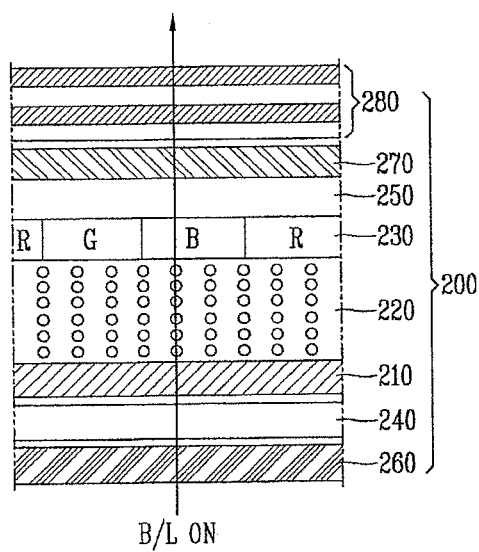
FIG. 5 is an overview of a display module with power being supplied to a backlight panel in accordance with one embodiment of the present invention.

In particular, FIG. 5 is an overview showing the display module 200 with power supplied to a backlight panel in accordance one embodiment of the present invention. As shown, the display module 200 includes a backlight unit disposed below the display module to emit light.

In more detail, the backlight unit is used as a source of an image provided to a user via the display module 200. The backlight unit is disposed to cover an outer surface of a first substrate of the display module 200, or a side surface of the display module 200, thereby emitting light toward the display module 200 via a light guide plate. The backlight unit includes the light guide plate, a light source, a reflection plate, and an optical sheet. For example, the light source may be configured by using, but not limited to, a PDP, OLED, LED, cold cathode tube and any device having the same function. However, the present invention is not limited to those devices.

Referring to FIG. 5, the display module 200 includes a pair of first and second substrates 210 and 230 bonded to each other with a liquid crystal layer 220 interposed therebetween. The pair of substrates 210 and 230 may include a plurality of pixels each having directionality. On each pixel are located a transparent pixel electrode of the first substrate 210 and a transparent common electrode of the second substrate 230. The pixel electrode and the common electrode face each other.

Also, an image signal voltage can be selectively applied to each pixel by a Thin Film Transistor (TFT), which is provided in one-to-one correspondence with the pixel. The second substrate 230 may include, for example, Red, Green and Blue (RGB) color filters to correspond to each pixel, and a black matrix filling a gap between the color filters. The RGB color filters and the black matrix may be obscured by the common electrode.

Thus, when an image signal voltage is applied to the pixel electrode of a pixel selected by a switching operation of the TFT, a voltage difference is generated between the corresponding pixel electrode and the common electrode, whereby liquid crystal molecules having optical anisotropies and polarizabilities are activated so as to exhibit a difference in transmittance. While light emitted from the backlight unit is transmitted through the display module 200, various planar color images are displayed by the difference in transmittance for each pixel and color combination of the RGB color filters. Here, the LCD panel is illustrated as the display module 200, but a cathode-ray tube, a plasma display panel, an OLED display panel or any type of display panel may also be used to implement the display module 200.

Polarizers 260 and 270 are provided on a lower surface of the first substrate 210 and an upper surface of the second substrate 230, respectively. Glass substrates 240 and 250 are interposed between the substrates 210 and 230 and the polarizers 260 and 270, respectively.

The glass substrate 250, which is interposed between the second substrate 230 and the polarizer 270 may be provided with patterns sensitive to touches. Accordingly, it is possible to detect an electrical change, which is generated within the glass substrate 250 due to a user's touch on the glass substrate 250, for example, a change in capacitance or the quantity of electric charges.

An electrode may be installed within the glass substrate 250, and formed as a conductive pattern. The electrode may be charged with electric charges. When an electric conductor moves within a close distance, the quantity of electric charges being charged can change accordingly. When an electric conductor, for example, a user's finger touches a window, the quantity of electric charges being charged in the electrode may change, which is eventually the same as the change in capacitance between the finger and the electrode.

Further, the electrode of the glass substrate 250 may be electrically connected to a controller, for example, a circuit board for detecting changes in the quantity of electric charges. For the electrical connection, a flexible printed circuit board may be connected to the circuit board via a hole. As the change in the quantity of electric charges is detected, the circuit board may change a state of at least one function relating to the mobile terminal 100.

Figure 6:
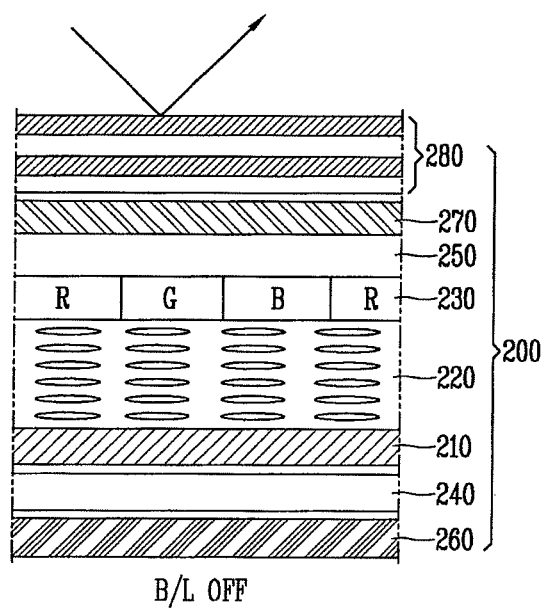
FIG. 6 is an overview of the display module with power not supplied to the backlight panel in FIG. 4.
Figure 7:
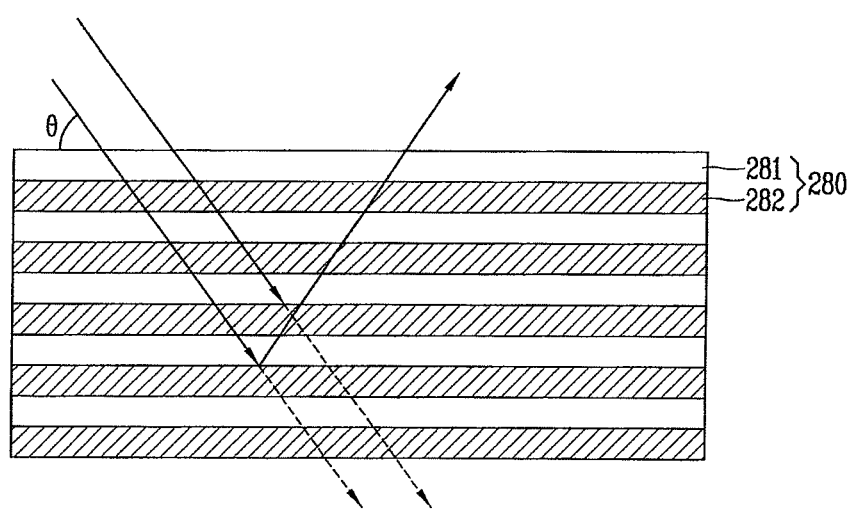
FIG. 7 is an overview showing a conversion layer in accordance with one embodiment of the present invention.

FIG. 6 is an overview of the display module 200 with power not being supplied to the backlight panel shown in FIG. 4, and FIG. 7 is an overview showing the conversion layer 280 according to one embodiment of the present invention. As shown in FIG. 6, a first film 281 and a second film 282 are alternating in plurality on the conversion layer 280. A refractive index of the first film 281 is preferably higher than that of the second film 282. Preferably, the refractive index of the first film 281 is in the range of 2.5 to 2.9, and the refractive index of the second film 282 is in the range of 1.8 to 2.3.

The first film 281 may contain a preset percent by weight of titanium dioxide ($TiO_2$) to have the aforementioned refractive index. Also, the second film 282 may contain a preset percent by weight of zinc oxide (ZnO) to have the aforementioned refractive index. The metal oxides contained in the first film 281 and the second film 282 are not limited to those metal oxides, but any metal oxide which can provide a required refractive index may be used.

In addition, the sum of thicknesses of the first film 281 and the second film 282 is preferably in the range of 10 μm to 300 μm, so as to have satisfactory anti-glare property and scratch resistance. Five or more of each film may preferably be laminated in an alternating manner. This is why light with wavelengths less than a preset length is absorbed or reflected while transmitted through each film. Here, the reflected light may have an incident light reduced while transmitted through each film.

The conversion layer 280 may also include at least one pigment layer so as to absorb visible rays with a preset wavelength range. At a lower surface of the pigment layer may be formed a reflection layer for reflecting wavelengths which are not absorbed by the pigment layers. The pigment layer and the reflection layer may be formed in the middle of the conversion layer, but are preferably laminated on the lowest layer thereof so as to absorb or reflect the last wavelength which has been converted while being transmitted through those films.

A method for containing pigments in the pigment layer may be implemented by using one or more of a polymer film in which at least one type of pigment is mixed in a transparent resin, a polymer film which is produced by casting a mixture in which at least one type of pigment is dispersed/dissolved in a dope of a resin organic solvent or a resin monomer/organic solvent, a coating layer that a transparent base is coated with a paint prepared by mixing at least one pigment in a resin binder and organic solvent, and a transparent adhesive containing at least one type of pigment.

The pigment may be composed of typical dyes or colorants having a desired absorption wavelength within a visible ray area. Exemplary types of pigments may include, but not limited to, organic colorants, typically on the market, for example, anthraquinone, phtalocyanine, methane, azamethine, oxadine, azo, styryl, kemarin, porphyrin, dibenzofranon, diketopyrrolopyrrole, rhodamine, xanten, pyrromethene and the like. The types and concentrations of the pigments may be determined by absorption wavelength, absorption coefficient, hue, transmission property, transmittance, type and thickness of medium or coated film for dispersion and the like, all related to the pigments.

As shown in FIG. 7, wavelengths within the visible area can be adsorbed by the conversion layer 280, and converted into infrared wavelengths belonging to a non-visible area.

The converted wavelengths can be decided by the following Equation.

$$\lambda = \frac{2\pi}{m} p\bar{n}\cos\theta$$

$$\bar{n} = \sqrt{\frac{n_1^2 + n_2^2}{2}}$$

Equation 1

Here, $\lambda$ denotes a converted wavelength ($\mu m$), $n_1$ denotes a refractive index of the first film 281, and $n_2$ denotes a refractive index of the second film 282. Also, $\theta$ denotes an incident angle, m denotes the sum of the number of each film, and p denotes the sum ($\mu m$) of thicknesses of the first film 281 and the second film 282.

The foregoing embodiments and advantages of the display module and the mobile terminal having the same are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A display module, comprising:
a first substrate and a second substrate facing each other;
a liquid crystal layer located between the first and second substrates;
a first polarizer laminated on the first substrate; and
a conversion layer laminated on the first polarizer,
wherein the conversion layer includes a plurality of first films and a plurality of second films in an alternating manner, each of the first films having a first refractive index, and each of the second films being laminated on a lower surface of a corresponding first film and having a second refractive index lower than the first refractive index, and
wherein the conversion layer is configured to reflect light with an infrared ray band, a sum of thicknesses of the first and second films is more than at least 10 $\mu m$, the first film has a refractive index in the range of 2.5 to 2.9, and the second film has a refractive index in the range of 1.8 to 2.3.

2. The display module of claim 1, wherein the conversion layer includes more than five of the first and second films in the alternating manner.

3. The display module of claim 1, wherein the first film has the refractive index in the range of 2.5 to 2.9 by containing a preset percent by weight of titanium dioxide ($TiO_2$).

4. The display module of claim 3, wherein the second film has the refractive index in the range of 1.8 to 2.3 by containing a preset percent by weight of zinc oxide (ZnO).

5. The display module of claim 1, wherein the conversion layer includes at least one pigment layer so as to absorb light with wavelengths within a preset range.

6. The display module of claim 5, wherein the conversion layer includes at least one reflection layer laminated on a lower surface of the pigment layer so as to reflect light with wavelengths out of the preset range.

7. A mobile terminal comprising:
a terminal main body;
a wireless communication unit configured to wirelessly communicate with at least one other terminal; and
a display module mounted in the terminal main body and configured to display image information,
wherein the display module comprises:
a first substrate and a second substrate facing each other;
a liquid crystal layer located between the first and second substrates;
a first polarizer laminated on the first substrate; and
a conversion layer laminated on the first polarizer, and
wherein the conversion layer includes a plurality of first films and a plurality of second films in an alternating manner, each of the first films having a first refractive index, and each of the second films being laminated on a lower surface of a corresponding first film and having a second refractive index lower than the first refractive index, and
wherein the conversion layer is configured to reflect light with an infrared ray band, a sum of thicknesses of the first and second films is more than at least 10 $\mu m$, the first film has a refractive index in the range of 2.5 to 2.9, and the second film has a refractive index in the range of 1.8 to 2.3.

8. The terminal of claim 7, wherein the conversion layer includes more than five of the first and second films in the alternating manner.

9. The terminal of claim 7, wherein the first film has the refractive index in the range of 2.5 to 2.9 by containing a preset percent by weight of titanium dioxide ($TiO_2$).

10. The terminal of claim 9, wherein the second film has the refractive index in the range of 1.8 to 2.3 by containing a preset percent by weight of zinc oxide (ZnO).

11. The terminal of claim 7, wherein the conversion layer includes at least one pigment layer so as to absorb light with wavelengths within a preset range.

12. The terminal of claim 11, wherein the conversion layer includes at least one reflection layer laminated on a lower surface of the pigment layer so as to reflect light with wavelengths out of the preset range.

13. A method of manufacturing a display module for a mobile terminal, the method comprising:
   providing a first substrate and a second substrate facing each other;
   locating a liquid crystal layer between the first and second substrates;
   laminating a first polarizer on the first substrate; and
   laminating a conversion layer on the first polarizer,
wherein the conversion layer includes a plurality of first films and a plurality of second films laminated in an alternating manner, each of the first films having a first refractive index, and each of the second films being laminated on a lower surface of a corresponding first film and having a second refractive index lower than the first refractive index, and
   wherein the conversion layer is configured to reflect light with an infrared ray band, a sum of thicknesses of the first and second films is more than at least 10 µm, the first film has a refractive index in the range of 2.5 to 2.9, and the second film has a refractive index in the range of 1.8 to 2.3.

14. The method of claim 13, wherein the conversion layer includes more than five of the first and second films in the alternating manner.

15. The method of claim 13, wherein the first film has the refractive index in the range of 2.5 to 2.9 by containing a preset percent by weight of titanium dioxide ($TiO_2$).

16. The method of claim 15, wherein the second film has the refractive index in the range of 1.8 to 2.3 by containing a preset percent by weight of zinc oxide (ZnO).

17. The method of claim 13, wherein the conversion layer includes at least one pigment layer so as to absorb light with wavelengths within a preset range, and
   wherein the conversion layer includes at least one reflection layer laminated on a lower surface of the pigment layer so as to reflect light with wavelengths out of the preset range.

18. The display module of claim 1, wherein the conversion layer reflects light with the infrared ray band when a power to a blacklight unit of the display module is turned OFF.

19. The terminal of claim 7, wherein the conversion layer reflects light with the infrared ray band when a power to a blacklight unit of the display module is turned OFF.

* * * * *